L. B. GAYLOR.
ANTISKID GRIP.
APPLICATION FILED OCT. 17, 1911.
1,020,489.
Patented Mar. 19, 1912.
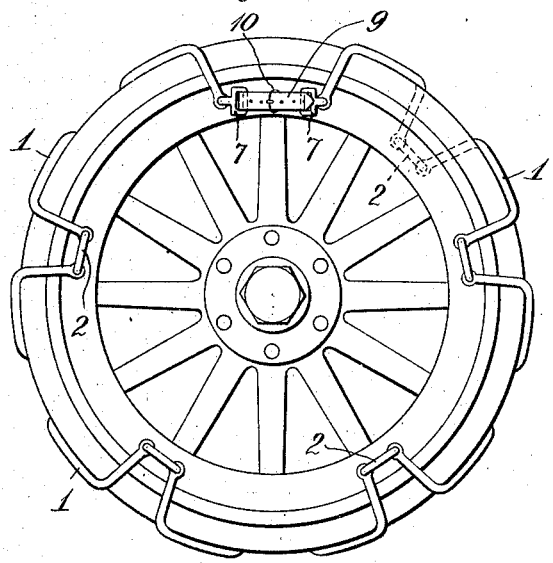
Fig. 1.
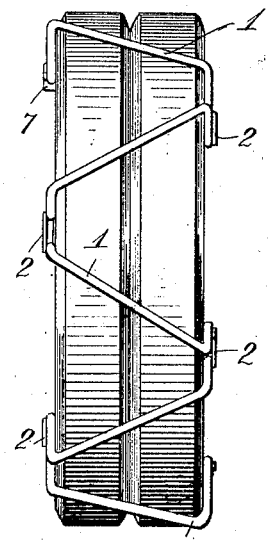
Fig. 2.
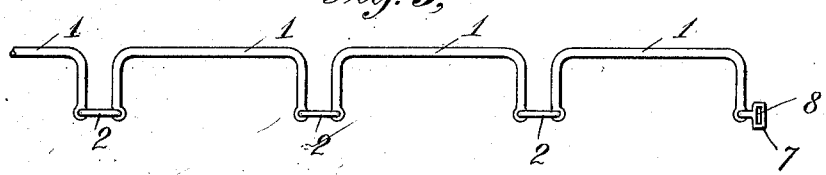
Fig. 3.
Fig. 4.
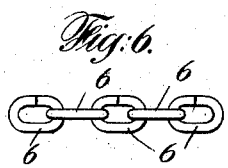
Fig. 5.
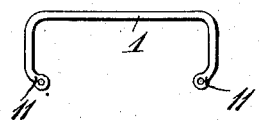
Fig. 6.
Fig. 7.
Witnesses:
Inventor
Leonard B. Gaylor,
By his Attorney
Phillips Abbott.

UNITED STATES PATENT OFFICE.

LEONARD B. GAYLOR, OF STAMFORD, CONNECTICUT.

ANTISKID-GRIP.

1,020,489.   Specification of Letters Patent.   Patented Mar. 19, 1912.

Application filed October 17, 1911. Serial No. 655,234.

*To all whom it may concern:*

Be it known that I, LEONARD B. GAYLOR, a citizen of the United States, and a resident of the city of Stamford, county of Fairfield, State of Connecticut, have invented a new and useful Improvement in Antiskid-Grips, of which the following is a full, clear, and exact description.

This new grip, while at first glance suggestive of certain other grips now in use, will be found, upon examination, to materially differ therefrom, since it embodies new structural features and operates upon an entirely new principle, whereby certain important advantages are secured.

Generally stated, the invention consists in a series of separate grip irons, each being a piece of metal bent into the general shape of a letter U, that is to say, the metal rod or bar composing each individual grip iron has a central member which is adapted to span diagonally across the face of the tire and two end members which are bent at substantially right angles to the central member, adapted to be arranged radially of the wheel at either side of the tire and wheel rim and the adjoining ends of these rectangular members of the several grip irons are linked or flexibly connected together on alternate sides of the wheel, and at the ends of the series means are provided whereby the grip as a whole may be pulled into a more or less straight line, depending upon the width of the tire, and thus the radial members of the grip irons will be held snugly to the sides of the wheel rim and the central member will be drawn snugly down upon and held to the face or tread of the tire. It will be seen that from this construction a great advantage is secured as compared with any other grip known to me, arising from the fact that it does not have to be made to fit the width of the tire.

The individual grip irons are made of much greater width than the tread of the wheels for which they are intended, so that if they are placed at right angles across the tire, there will be much space between the radially disposed ends of the sides of the rim, but when they are drawn to place around the wheel by the stretching and fastening device, the individual irons then assume angular positions relative to the plane of the wheel and thus the distance between their rectangular ends in the direction of that plane rapidly decreases, so that when fully adjusted the ends of the grip irons hug the sides of the rim and their central members are drawn snugly down upon the face or periphery of the tire as above suggested. The degree of pressure exerted at both these places will be determined entirely by the degree of pull or strain that is exerted upon the grip by the adjustable connecting and holding means. It may be slight so as to permit the grip to crawl around the tire, as is sometimes desired, or so great as to practically hold the grip immovably to the wheel and tire.

Another important advantage is that my grips are peculiarly adapted for use on the wheels of heavy trucks which have dual tires. Wheels of this character and their tires are made of a great many different widths and as they are almost invariably driven by sprocket chains which clear the inner side of the wheel rim by a short distance only, usually about one and one half inches, it is imperatively necessary that neither the grip irons nor the fastening device shall project from the wheel sufficiently to make it in any way possible for them to catch on the driving chain, for serious damage and perhaps fatal accident might result therefrom. It will be noted that by my invention not only do I secure close fit of the ends of the grip irons against the inner side of the rim of the wheel, but also I am enabled to use a single fastening or connecting device only and that may be upon the outside of the wheel, so that the inside of the wheel will be smooth and present no surface apt to catch upon the driving chain. I wish it understood, however, that more than one fastening device may be used, if preferred, to be located preferably on the outside of the wheel, so as to avoid conflict with the driving chain. This is sometimes convenient because if so they may be used to adjust the grip to wheels of different size, thus securing even spacing of the grip irons on the tire. I also sometimes to give even greater assurance that there shall be no conflict between the driving chain and the grip irons or their connecting devices, bend the ends of the radial members inwardly somewhat, as shown at 11 in Fig. 7. If this construction is adopted there must be space enough left between the inwardly bent ends to allow the grip irons to be readily placed upon the tire when they are arranged at right angles to it and when the grip as a whole is stretched about the wheel, these inwardly bent parts will be drawn into the recess caused by the overhang of the rim.

Another advantage in this grip is its extreme simplicity and economical construction, also the compactness with which it may be folded for transportation when not in use and the ease with which it can be applied to the wheel. Consequently it may be conveniently carried on the car for emergency use only, if desired.

Referring to the drawings, Figure 1 illustrates an elevation of the grip as applied on a truck wheel having dual tires of solid rubber; Fig. 2 illustrates an edgewise elevation of that which is shown in Fig. 1; Fig. 3 illustrates a series of grip irons shown in a straight line with their ends flexibly linked together; Fig. 4 illustrates one form of link which may be employed to flexibly connect the ends of the individual grip irons; Fig. 5 illustrates a modified construction of link; Fig. 6 illustrates a series of smaller links which may be employed if desired; Fig. 7 illustrates a grip iron the ends of which are bent inwardly for greater assurance against fouling with the drive chain.

In the drawings 1, 1, represent the grip irons. They are preferably made from steel rods or bars, say from one half to three quarters of an inch in diameter. The steel may however be oval, square or of any other preferred cross section. The bar is cut into proper lengths, the ends are flattened and drilled or otherwise treated so as to form an eye therein. They are then bent into the general U shape shown in the drawings in which there is a central member which spans across the tire of the wheel when the grip is arranged in zig-zag fashion thereon and two end members which are disposed radially of the wheel, as shown in Fig. 1. The ends of the grip irons as shown in the drawings, on alternating sides of the wheel are flexibly linked together by links or fasteners 2 which may be of any preferred form and of any preferred material. Those shown in Figs. 1, 2 and 3 are illustrated in plan in Fig. 4. In these drawings I show them as made of metal and they may be made as shown at 3 in Fig. 5, or a series of smaller links 6, 6, may be joined together as shown in Fig. 6. I show all of these links as being open ended. If so, they will of course be made of such stiffness of metal as to withstand the strains to which they will be subjected without straightening out. If, however, it is desired, the ends may be welded or brazed together after insertion in the eyes of the grip irons. Also material other than metal may be used for these connections, as, for example, straps of leather or composition.

At the ends of the series of grip irons I provide a connection piece 7 which has a square opening 8 adapted to receive the adjusting and fastening strap 9 (see Fig. 1). I show a single adjusting and fastening device in the drawings hereof, but, as stated above, obviously another of similar construction may be inserted at the opposite side of the wheel or two additional ones spaced substantially on thirds around the wheel may be used. Indeed this is sometimes convenient because the additional ones afford means whereby the individual grip irons may be more conveniently spaced about the wheel. It will of course be unnecessary to illustrate a plurality of these devices because they will merely be repetitions of the one shown at 9 in Fig. 1.

The operation from what has been stated above is obvious. The grip irons flexibly linked together as stated are preferably gathered together side by side and placed at substantially right angles across the tire of the wheel. They are then opened up around the wheel during which they automatically assume a diagonal position across the tire. They are pulled or stretched out by hand until the fastening strap 9 or equivalent device can be properly engaged in the connection piece 8. Then the end of the strap is passed through the buckle 10 and suitably pulled upon, whereby the ends of the series of grip irons are drawn somewhat forcibly together, causing their radial ends to hug the rim of the wheel on both sides and their medial section to be drawn in upon the periphery or tread of the tire, thus securely holding the grip in place. This adjustment of the parts is possible because the ends of the individual grip irons are flexibly linked together and the fastening device is, or may be upon the outside of the wheel, easily accessible and free from all possible contact with the driving chain. It will also be particularly noted that the degree of hugging action that the ends of the individual grip irons exert upon the rim of the wheel and also the degree of snugness between the grip irons and the tread or periphery of the tire may be adjusted as desired by exerting greater or less strain upon the fastening strap. Furthermore the devices which flexibly connect the ends of the individual grip irons are arranged in a plane parallel to the tread of the tire, so that their round, smooth corners are presented on both sides of the rim and the inner ends of the grip irons being drawn close to the sides of the rim, especially if curved inwardly as shown in Fig. 7 at 11, there is no surface presented which can catch upon the driving chain.

It will be obvious to those who are familiar with this art that modifications may be made in the details of construction without departing from the essentials of the invention. I therefore do not limit myself to the details as illustrated and described, that which I have shown herein being one form only in which the invention may be embodied and particularly I call attention to the fact that other fastening devices may be employed instead of the strap 9 and sometimes this may be desirable since a strap in certain conditions of use might be too perishable to reliably serve the purpose. I illustrate and describe a strap because in my opinion it is the most convenient form of fastener for urban use where heavy trucks are almost exclusively used.

I desire it to be particularly understood that the number of grip irons embodied in any particular grip may be such as preferred. I illustrate ten in Fig. 1 of the drawings hereof, but frequently even so few as four will serve a very useful purpose. The number used will depend upon the size and width of the wheel.

I also call attention to the fact that my grip is peculiar in that the grip irons not only extend diagonally across the face of the tire, thus securing a more uniform, smooth and steady drive, but also that they successively cross the face of the tire on reverse angles.

My grip is the only one known to me which, when not in use, presents what may be called a chain-like succession of rigid individual grip irons, each having a central section which spans the tire and side members integral therewith at substantially right angles thereto, and universally flexible connecting devices, such as links, which connect the adjoining ends of the grip irons on alternate sides of the wheel, first on the inside and then on the outside. By this construction I secure a series of advantages never before known, so far as I am aware, among them the following: When the grip is applied to the wheel and its ends drawn tight, the individual grip irons will be forced into diagonal positions alternately in opposite directions across the face of the shoe and restricted from further extension by the contact of the side arms against the sides of the wheel, or of the shoe, if the latter shall project beyond the sides of the wheel rim. Consequently the grip will be held to the wheel and the individual grip irons maintained in position diagonally crossing the tire, thus affording the desired non-slipping action. The grip irons can be folded flat side by side, the universally flexible connections rendering this possible, thus securing extreme compactness. The connecting link-like devices are very short and are intermittent on alternate sides of the wheel, thus reducing noise, mud accumulations, liability to fracture, injury to the paint on the wheels, weight, improving the appearance of the car and entirely doing away with the continuous confining devices, usually chains, which encircle both sides of the wheel and which are necessary in all forms of flexible tire grip known to me. Lastly, by my construction, the stretching and holding devices which connect the free ends of the grip as a whole, may be upon the outside of the wheel, thus entirely free from any possible conflict with the driving chain.

I claim:

1. A tire grip comprising a series of rigid, individual grip irons, each comprising a central part longer than the width of the tire and side members integral therewith at substantially right angles thereto and wholly in the same plane as the central part, and universally flexible link-like connections alternately uniting the adjacent ends of adjacent side members on opposite sides of the wheel.

2. A tire grip comprising a series of rigid, individual grip irons, each comprising a central part longer than the width of the tire and side members integral therewith at substantially right angles thereto and wholly in the same plane as the central part, flexible connections alternately uniting the adjacent ends of adjacent side members on opposite sides of the wheel, and means on the outside of the wheel to draw together and hold the free ends of the tire grip.

3. A tire grip comprising a series of rigid, individual grip irons, each comprising a central part adapted to span across the face of the tire and side members integral therewith at substantially right angles thereto and wholly in the same plane as the central part, the free ends of which side members are bent toward each other, and universally flexible connecting devices uniting the ends of adjoining side members.

4. In a tire grip, a series of rigid, U-shaped grip irons, comprising a central part and side members all wholly in the same plane, alternating with flexible connecting devices, so as to constitute a single, straight, chain-like structure, and means for adjustably connecting its free ends together.

In testimony whereof I have signed my name to this specification in the presence of two subscribing witnesses.

LEONARD B. GAYLOR.

Witnesses:
CORNELIUS P. MCLAUGHLIN,
F. M. DOUSBACH.